United States Patent
Golara et al.

(10) Patent No.: US 11,114,938 B1
(45) Date of Patent: Sep. 7, 2021

(54) ANALOG SUPPLY GENERATION USING LOW-VOLTAGE DIGITAL SUPPLY

(71) Applicant: Apple Inc., Cupertino, CA (US)

(72) Inventors: Soheil Golara, San Jose, CA (US); Ali Mesgarani, Sunnyvale, CA (US); Mansour Keramat, Los Gatos, CA (US); Seyedeh Sedigheh Hashemi, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/006,700

(22) Filed: Aug. 28, 2020

(51) Int. Cl.
  *H02M 3/07* (2006.01)

(52) U.S. Cl.
  CPC ............. *H02M 3/073* (2013.01); *H02M 3/07* (2013.01); *H02M 3/072* (2021.05)

(58) Field of Classification Search
  None
  See application file for complete search history.

(56) References Cited

U.S. PATENT DOCUMENTS

| | | | | |
|---|---|---|---|---|
| 5,999,475 A * | 12/1999 | Futatsuya | ............... | G11C 16/12 365/185.23 |
| 6,738,271 B2 * | 5/2004 | Umeda | .................... | H02M 3/07 327/536 |
| 7,532,061 B2 * | 5/2009 | Ragone | .................... | G11C 5/145 327/536 |
| 7,969,231 B2 * | 6/2011 | Yamahira | ............... | G11C 5/145 327/536 |
| 8,030,988 B2 * | 10/2011 | Yap | .................... | H02M 3/073 327/536 |
| 8,040,174 B2 * | 10/2011 | Likhterov | ............... | H02M 3/07 327/536 |
| 8,699,247 B2 * | 4/2014 | Nguyen | .................. | H02M 3/07 363/59 |
| 9,729,048 B2 | 8/2017 | Crandall et al. | | |
| 9,780,674 B2 | 10/2017 | Freeman et al. | | |
| 2003/0053321 A1 * | 3/2003 | Ishiyama | ............. | G09G 3/3648 363/59 |
| 2006/0028193 A1 * | 2/2006 | Migliavacca | ............. | G05F 3/30 323/316 |

(Continued)

OTHER PUBLICATIONS

Sun et al., "A low-power-consumption, supply-noise-insensitive charge pump PLL with a voltage regulator for on-chip clock generating in MAPS at STAR experiment," 2008 IEEE Nuclear Science Symposium Conference Record, Oct. 19-25, 2008, 3 pages.

(Continued)

*Primary Examiner* — Thomas J. Hiltunen
(74) *Attorney, Agent, or Firm* — Kowert, Hood, Munyon, Rankin & Goetzel, P.C.

(57) ABSTRACT

A power supply circuit included in a computer system is configured to generate a particular voltage level on a regulated power supply node using multiple charge pump circuits coupled together via a regulation device to provide regulation. A first charge pump circuit is configured to, using a voltage of an input power supply node, generate an intermediate voltage level, which is regulated by the regulation device. The second charge pump is configured to generate a voltage level on the regulated power supply node using a regulated version of intermediate voltage level. An impedance of the regulation device is adjusted using results of comparing the voltage level of the regulated power supply node to a reference voltage.

20 Claims, 10 Drawing Sheets

(56) References Cited

U.S. PATENT DOCUMENTS

2010/0052771 A1* 3/2010 Hartono ............... H02M 3/073
                                                    327/536
2018/0234063 A1   8/2018 King et al.
2020/0014374 A1   1/2020 Loke et al.

OTHER PUBLICATIONS

Huang et al., "Low-Ripple and Dual-Phase Charge Pump Circuit Regulated by Switched-Capacitor-Based Bandgap Reference," IEEE Transactions on Power Electronics, vol. 24, No. 5, May 2009, pp. 1161-1172.

* cited by examiner

ANALOG SUPPLY GENERATION USING LOW-VOLTAGE DIGITAL SUPPLY

BACKGROUND

Technical Field

Embodiments described herein relate to integrated circuits, and more particularly, to techniques for generating power supply voltage levels.

Description of the Related Art

Modern computer systems may include multiple circuits blocks designed to perform various functions. For example, such circuit blocks may include processors and/or processor cores configured to execute software or program instructions. Additionally, the circuit blocks may include memory circuits, mixed-signal or analog circuits, and the like.

In some computer systems, the circuit blocks may be designed to operate at different power supply voltage levels. Power management circuits may be included in such computer systems to generate and monitor varying power supply voltage levels on the power supply nodes for the different circuit blocks.

Power management circuits often include one or more power supply circuits configured to generate regulator voltage levels on respective power supply signals using a voltage level of an input power supply signal. Such power supply circuits may employ different techniques for regulating the voltage level of the power nodes. For example, a power supply circuit may include a switching regulator, a linear regulator, or any suitable combination thereof.

SUMMARY OF THE EMBODIMENTS

Various embodiments for generating a voltage level on a regulated power supply node using a lower-voltage power supply are disclosed. Broadly speaking, a power supply circuit includes multiple charge pump circuits coupled together via a device whose conductance is adjusted to maintain a desired voltage level on the regulated power supply node. In particular, a first charge pump circuit is configured to generate a given voltage on a first power supply node using a clock signal and an input power supply, where the given voltage is greater than a voltage of the input power supply node. A device coupled between the first power supply node and a second power supply node is configured to adjust, using a control signal, a conductance between the first and second power supply nodes. A second charge pump circuit is configured to generate, using the second power supply node and the clock signal, a particular voltage on the regulated power supply node. A control circuit may be configured to generate the control signal using a voltage of the regulated power supply node and a reference voltage. In some embodiments, the control circuit may include a voltage divider circuit configured to generate a feedback signal using the voltage of the regulated power supply node. In another non-limiting embodiment, the control circuit may include an amplifier circuit configured to compare the reference voltage and a voltage level of the feedback signal to generate the control signal.

BRIEF DESCRIPTION OF THE DRAWINGS

The following detailed description makes reference to the accompanying drawings, which are now briefly described.

Figure 1:
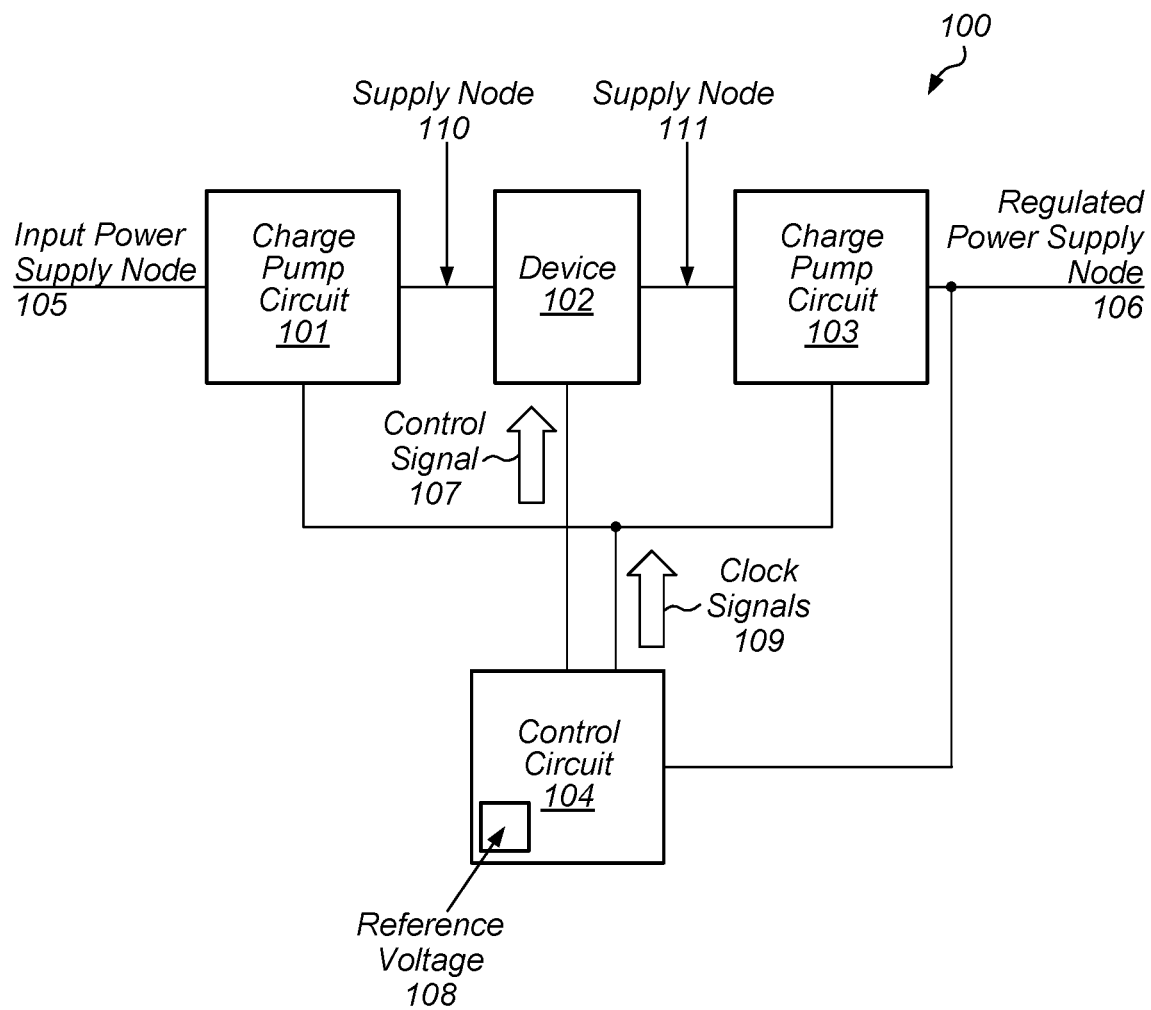
FIG. 1 is a block diagram of an embodiment of a power supply circuit.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph (f) interpretation for that unit/circuit/component. More generally, the recitation of any element is expressly intended not to invoke 35 U.S.C. § 112, paragraph (f) interpretation for that element unless the language "means for" or "step for" is specifically recited.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. The phrase "based on" is thus synonymous with the phrase "based at least in part on."

DETAILED DESCRIPTION OF EMBODIMENTS

Computer systems may include multiple circuit blocks configured to perform specific functions. For example, a computer system may include a processor circuit, a memory circuit, and various analog. radio-frequency, and mixed-signal circuits. Such analog, radio-frequency, and mixed-signal circuits blocks may perform a variety of functions, such as analog-to-digital conversion, radio-frequency up convert and down convert, amplification of signals, and the like.

To operate properly, analog, radio-frequency, and mixed-signal circuits may employ high-voltage, low-noise, and high-precision power supply nodes (also referred to "power supply rails"). In some cases, an off-chip power management integrated circuit (PMIC) may be used to generate the desired high-precision high-voltage levels, while on-chip regulated circuits may be employed to suppress noise on the power supply nodes.

In ultra-dense digital-intensive integrated circuits (e.g., a system-on-a-chip or "SoC"), it can be costly to include on-chip regulator circuits and to include the solder bumps needed to connect to external PMICs. The added cost makes it difficult for high-performance analog circuits to coexist with digital circuits on an SoC.

The inventors have realized that using charge pump circuits, it is possible to design a high-precision analog power supply circuit that utilizes low-voltage noisy digital power supply rails to generate high voltages with low noise on analog supply nodes. For example, in some cases, it is possible to generate an analog supply voltage of 1.2 volts from a low-voltage digital supply rail at 0.4 volts. The embodiments illustrated in the drawings and described below may provide techniques for implementing a power supply circuit that can generate, using a digital power supply node, a voltage level suitable for use by an analog or mixed-signal circuit.

A block diagram depicting an embodiment of a power supply circuit is depicted in FIG. 1. As illustrated, power supply circuit 100 includes charge pump circuit 101, device 102, charge pump circuit 103, and control circuit 104.

Charge pump circuit 101 is configured to generate a given voltage on supply node 110 using clock signals 109 and a voltage level of input power supply node 105. In various embodiments, input power supply node 105 may be a low-voltage digital power supply node. As described below in more detail, charge pump circuit 101 may include multiple devices that may be configured to repeatedly charge and discharge multiple capacitors to generate the given voltage on supply node 110. It is noted that, in some embodiments, the voltage level of supply node 110 may be greater than the voltage level of input power supply node 105. In some cases, the voltage generated on supply node 110 may be represented by Equation 1, wherein $V_{supply}$ is the voltage level of supply node 110, $V_{input}$ is the voltage level of input power supply node 105, and $\Delta V$ is a change from the ideal performance of charge pump circuit 101.

$$V_{supply} = 2V_{input} - \Delta V \tag{1}$$

Device 102 is coupled between supply node 110 and supply node 111. In various embodiments, device 102 is configured to adjust, using control signal 107, a conductance between supply node 110 and supply node 111. By adjusting the conductance between supply nodes 110 and 111, a voltage level of supply node 111 may be regulated to a particular value. As described below in more detail, a voltage level of control signal 107 may be based on a comparison of regulated power supply node 106 and reference voltage 108. In some cases, the voltage generated on supply node 111, may be represented by Equation 2, where $V_{reg}$ is the voltage of supply node 111, and α is a value between 0 and 2 that corresponds to the regulation provided by device 102.

$$V_{reg} = \alpha V_{supply} \tag{2}$$

Charge pump circuit 103 is configured to generate, using supply node 111 and clock signals 109, a particular voltage on regulated power supply node 106. As with charge pump circuit 101, charge pump circuit 103 may be configured to repeatedly charge and discharge multiple capacitors to generate the particular voltage on supply node 110. In various embodiments, the voltage level of regulated power supply node 106 ($V_{output}$) may be given by Equation 3. It is noted that in the case in which α=2, power supply circuit 100 is able to generate a voltage level on regulated power supply node 106 that is at most three times the voltage level of input power supply node 105.

$$V_{output} = (1+\alpha)V_{reg} \tag{3}$$

As described above, the conductance between supply node 110 and supply node 111 is adjusted using control signal 107. Control circuit 104 is configured to generate control signal 107 using a voltage of regulated power supply node 106 and reference voltage 108. By adjusting control signal 107 in such a fashion, device 102 functions in a similar fashion to a linear regulator, allowing the voltage of regulated power supply node 106 to be adjusted by modifying the voltage of supply node 111.

In various embodiments, input power supply node 105 may a digital power supply intended for use with logic circuit. In order to create a higher voltage power supply suitable for use with some analog circuits, charge pump circuit 101 creates a voltage level on supply node 110 that is greater than the voltage level of input power supply node 105. The variable conductance, as adjusted by control signal 107, of device 102 generates a voltage level on supply node 111 that is lower than that of supply node 110. A time constant associated with a feedback loop used to generate control signal 107, may reduce the sensitivity of power supply circuit 100 to noise on input power supply node 105, in order to decrease noise on regulated power supply node 106. Charge pump 103 provides a further increase in voltage level from that of supply node 111 to generate a desired voltage level on regulated power supply node 106 that is suitable for use with some analog circuits.

Figure 2:
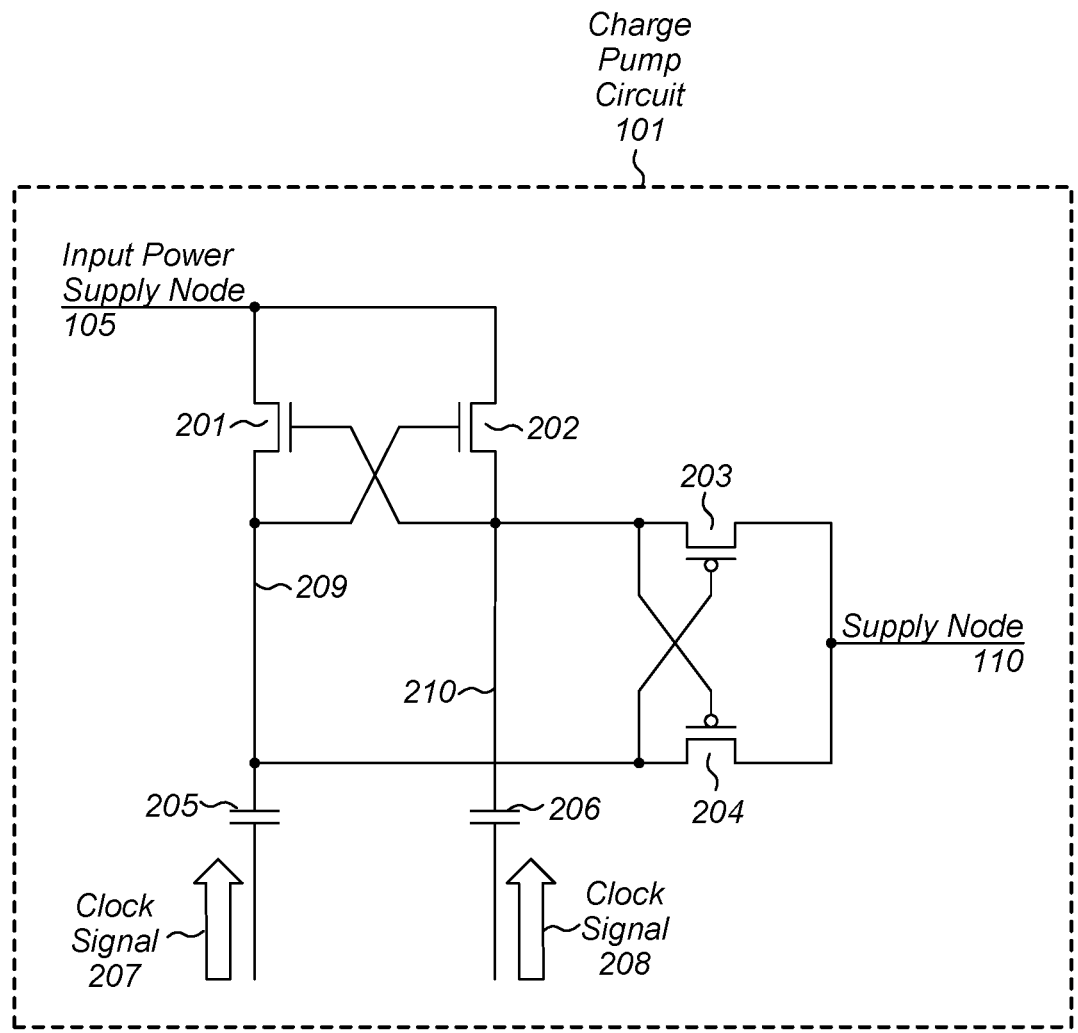
FIG. 2 is a block diagram of an embodiment of a charge pump circuit.

Turning to FIG. 2, a block diagram depicting an embodiment of charge pump circuit 101 is depicted. As illustrated, charge pump circuit 101 includes devices 201-204, and capacitors 205 and 206.

Device 201 is coupled between input power supply node 105 and node 209, and is controlled by a voltage level of node 210. Device 202 is coupled between input power supply node 105 and node 210, and is controlled by a voltage level of node 209. Additionally, device 203 is coupled between supply node 110 and node 210, and is controlled by the voltage level of node 209, while device 204 is coupled between supply node 110 and node 209, and is controlled by the voltage level of node 210.

In various embodiments, devices 201 and 202 may be n-channel metal-oxide semiconductor field-effect transistors (MOSFETs) or any other suitable transconductance device. Similarly, devices 203 and 204 may be p-channel MOSFETs or any other suitable transconductance device.

Clock signal 207 is coupled to node 209 via capacitor 205, while clock signal 208 is coupled to node 210 via capacitor 206. In various embodiments, clock signals 207 and 208 may be non-overlapping and may be included in clock signals 109. Capacitors 205 and 206 may, in various embodiments, be metal-oxide-metal (MOM) capacitors or any other suitable capacitor structure available on a semiconductor manufacturing process used to fabricate power supply circuit 100. Capacitors 205 and 206 include two conductive plates separated by an insulating material (e.g., silicon dioxide). The two plates are commonly referred to as the "top plate" and the "bottom" plate. The names are merely used to distinguish the two plates are not meant to imply any particular orientation or location.

During a first half cycle, clock signal 207 is at a low logic level and clock signal 208 is at a high logic level. The low logic level of clock signal 207 pre-charges a bottom plate of capacitor 205 to a voltage level at or near ground potential. The high logic level of clock signal 208 activates device 201, pre-charging node 209 to a voltage level of input power supply node 105.

During a second half cycle, clock signal 207 transitions to a high logic level and clock signal 208 transitions to a low logic level. When clock signal 207 transitions to a high logic level, the top plate of capacitor 205 (as well as node 209) jumps to a voltage level that is within a threshold of twice the voltage level of input power supply node 105. The voltage level on node 209 is then transferred to supply node 110 via device 204.

When the second half cycle completes, clock signal 207 transitions back to a low logic level, and clock signal 208 transitions to a high logic level. When clock signal 208 transitions to a high logic level, the top plate of capacitor 206 (as well as node 210) also jumps to a voltage level that is within a threshold of twice the voltage level of input power supply node 105. The voltage level of node 210 is then transferred to supply node 110 via device 203.

By repeatedly, transitioning clock signals 207 and 208, the voltage level of supply node 111 is within a threshold level of twice the voltage level of input power supply node 105. Since the voltage level of supply node 110 is substantially the same as twice the voltage level of input power supply node 105, charge pump circuit 101 may be referred to as a "voltage doubler circuit."

As used and described herein, a low logic level corresponds to a voltage at or near ground potential suitable to activate a p-channel MOSFET, while a high logic level corresponds to a voltage level at or near a voltage level of a power supply node suitable to activate an n-channel MOSFET. It is noted that, in other embodiments, low and high logic levels may correspond to different voltage levels.

Figure 3:
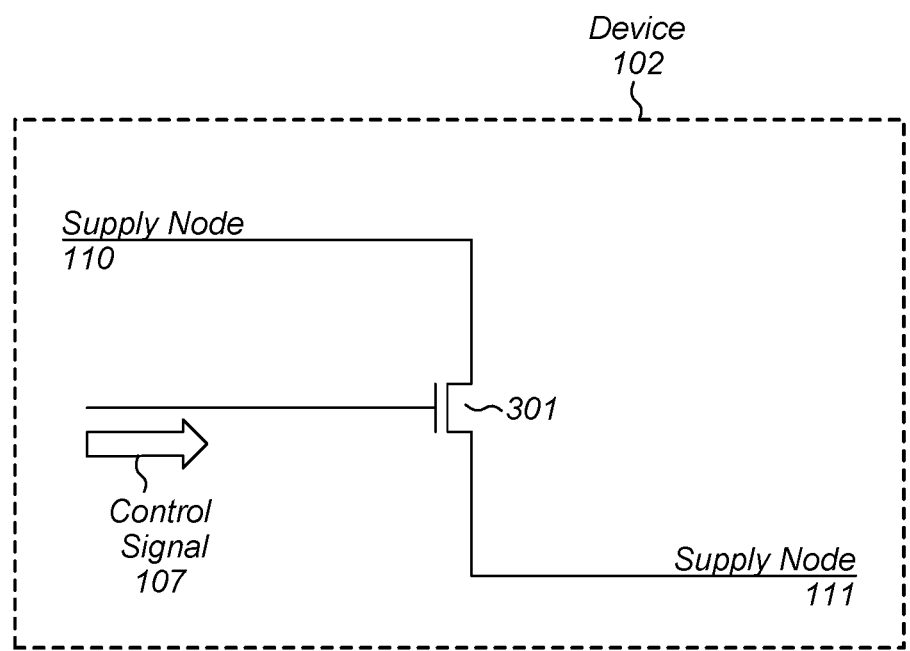
FIG. 3 is a block diagram of an embodiment of a device used in a power supply circuit.

A block diagram of an embodiment of device 102 is depicted in FIG. 3. As illustrated, device 102 includes transistor 301 that is coupled between supply node 110 and supply node 111. Transistor 301 is controlled by control signal 107. As described below in more detail, control signal 107 may be an analog signal whose voltage is based on a comparison of a voltage level of regulated power supply node 106 and reference voltage 108. Transistor 301 may be configured to change a conductance between supply node 110 and supply node 111 based on the voltage level of control signal 107.

In various embodiments, transistor 301 may be an n-channel MOSFET. Although only a single transistor is depicted in the embodiment of FIG. 3, in other embodiments, any suitable number of transistors may be employed. In some cases, different types of transistors (e.g., a p-channel MOSFET) may be used in lieu of, or in combination with transistor 301.

Figure 4:
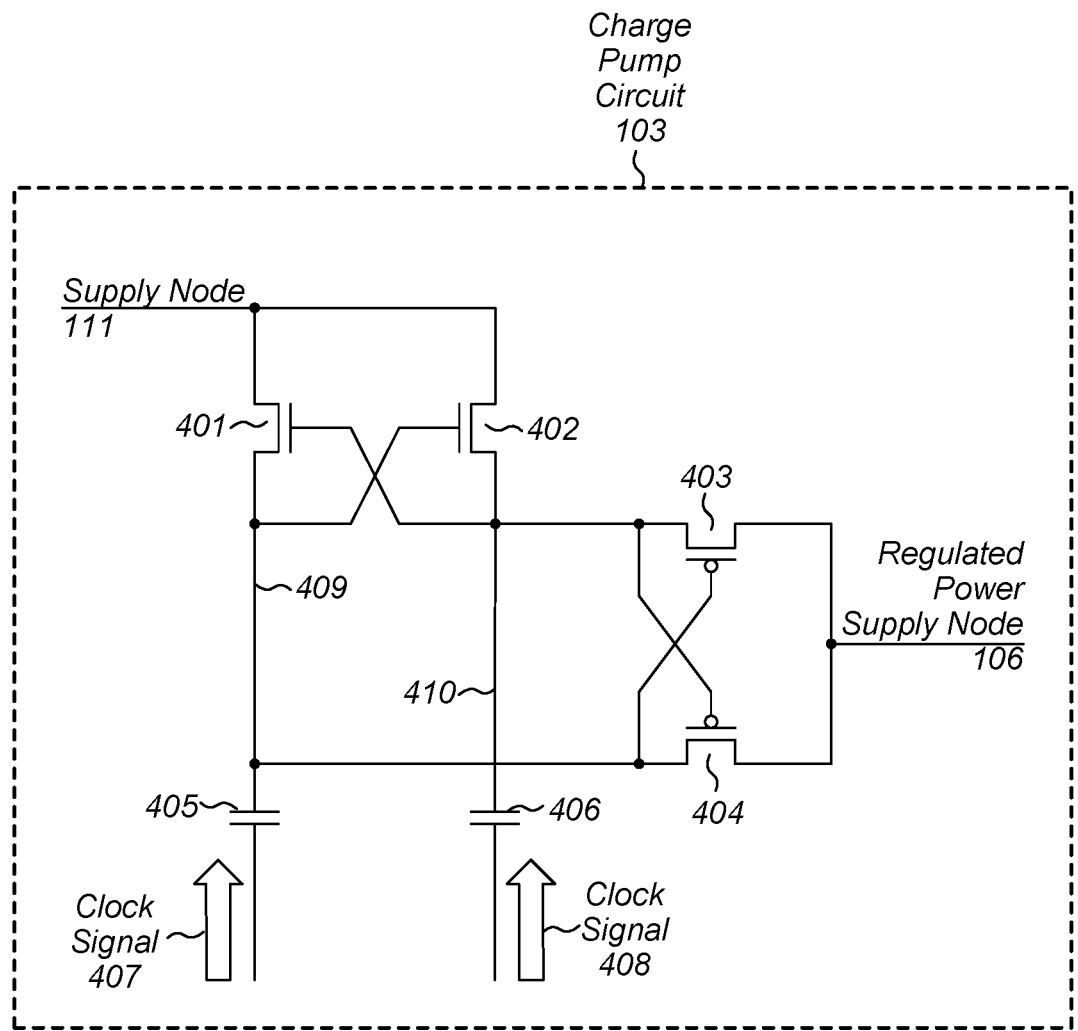
FIG. 4 is a block diagram of another embodiment of a charge pump circuit.

Turning to FIG. 4, a block diagram depicting an embodiment of charge pump circuit 103 is depicted. As illustrated, charge pump circuit 103 includes devices 401-404, and capacitors 405 and 406.

Device 401 is coupled between supply node 111 and node 409, and is controlled by a voltage level of node 410. Device 402 is coupled between supply node 111 and node 410, and is controlled by a voltage level of node 409. Additionally, device 403 is coupled between regulated power supply node 106 and node 410, and is controlled by the voltage level of node 409, while device 204 is coupled between regulated power supply node 106 and node 409, and is controlled by the voltage level of node 410.

In various embodiments, devices 401 and 402 may be n-channel MOSFETs or any other suitable transconductance device. Similarly, devices 403 and 404 may p-channel MOSFETs or any other suitable transconductance device.

Clock signal 407 is coupled to node 409 via capacitor 405, while clock signal 408 is coupled to node 410 via capacitor 406. In various embodiments, clock signals 407 and 408 may be non-overlapping clocks phases that are included in clock signals 109. Capacitors 405 and 406 may, in various embodiments, be metal-oxide-metal (MOM) capacitor or any other suitable capacitor structure available on a semiconductor manufacturing process used to fabricate power supply circuit 100.

During a first half cycle, clock signal 407 is at a low logic level and clock signal 408 is at a high logic level. The low logic level of clock signal 407 pre-charges a bottom plate of capacitor 405 to a voltage level at or near ground potential. The high logic level of clock signal 408 activates device 401, pre-charging node 409 to a voltage level of supply node 111.

During a second half cycle, clock signal 407 transitions to a high logic level and clock signal 408 transitions to a low logic level. When clock signal 407 transitions to a high logic level, the top plate of capacitor 405 (as well as node 409) jumps to a voltage level that is within a threshold of twice the voltage level of supply node 111. The voltage level on node 409 is then transferred to regulated power supply node 106 via device 404.

When the second half cycle completes, clock signal 407 transitions back to a low logic level, and clock signal 408 transitions to a high logic level. When clock signal 408 transitions to a high logic level, the top plate of capacitor 406 (as well as node 410) also jumps to a voltage level that is within a threshold of twice the voltage level of supply node 111. The voltage level of node 410 is then transferred to regulated power supply node 106 via device 403.

By repeatedly, transitioning clock signals 407 and 408, the voltage level of regulated power supply node 106 is within a threshold level of twice the voltage level of supply node 111. Since the voltage level of regulated power supply node 106 is substantially the same as twice the voltage level of supply node 111, charge pump circuit 103 may be referred to as a "voltage double circuit."

Figure 5:
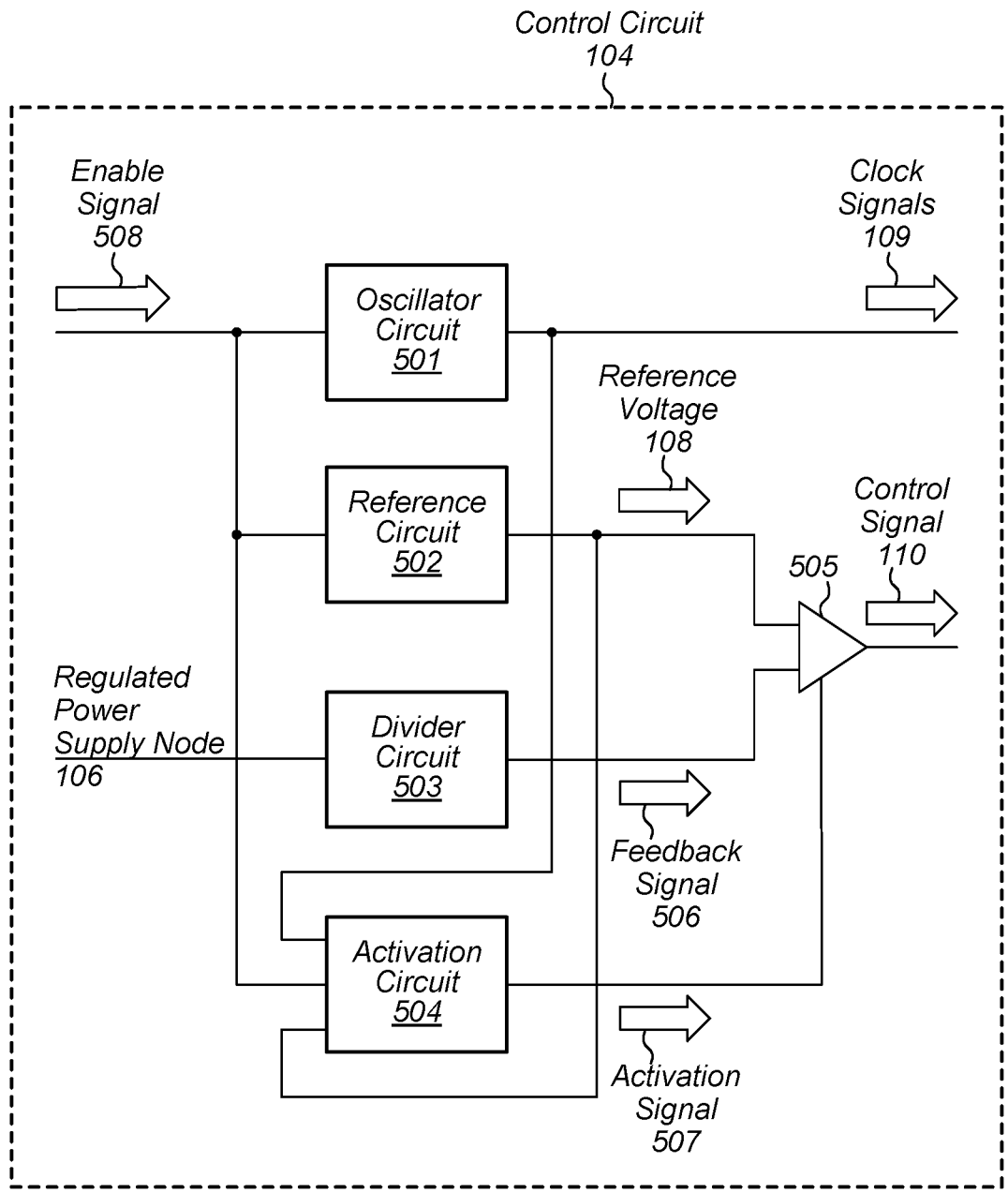
FIG. 5 is a block diagram of an embodiment of a control circuit.

Turning to FIG. 5, a block diagram of an embodiment of control circuit 104 is depicted. As illustrated, control circuit 104 includes oscillator circuit 501, reference circuit 502, divider circuit 503, activation circuit 504, and comparator circuit 505.

In response to an assertion of enable signal 508, oscillator circuit 501 is configured to generate clock signals 109. As noted above, clock signals 109 may include multiple non-overlapping clock signals. In various embodiments, oscillator circuit may include a voltage-controlled oscillator circuit, phase-locked loop circuits, or any other suitable circuit used in the generation of clock signals 109. In some embodiments, oscillator circuit 501 may employ an external clock or time reference signal (not shown) to generate clock signals 109. Oscillator circuit 501 may be further configured to halt the generation of clock signals 109 in response to a de-assertion of enable signal 508.

Reference circuit 502 is configured, in response to an assertion of enable signal 508, to generate reference voltage 108. In various embodiments, reference circuit 502 may be further configured to halt the generation of reference voltage 108 in response to a de-assertion of enable signal 508. In some embodiments, reference circuit 502 may include a bandgap reference circuit, or any other suitable supply and temperature independent reference circuits. As described below in more detail, there may a delay from a time when enable signal 508 is asserted and reference voltage 108 reaching a desired voltage level.

Divider circuit 503 is configured to generate feedback signal 506 using regulated power supply node 106. In various embodiments, divider circuit 503 may include a resistive voltage divider circuit, or any other suitable circuit configured to generate feedback signal 506 such that a voltage level of feedback signal 506 is less than a voltage level of regulated power supply node 106. By employing feedback signal 506, whose voltage level is less than that of regulated power supply node 106, the biasing of comparator circuit 505 may be less difficult than trying to set an operating point of comparator circuit 505 near the voltage level of regulated power supply node 106.

Activation circuit 504 is configured to generate activation signal 507 in response to an assertion of enable signal 508. In various embodiments, activation circuit 504 may employ a counter or other similar sequential logic circuit configured to detect when a particular number of cycles of one of clock signals 109 have elapsed before asserting activation signal 507. In various embodiments, activation circuit 504 may be further configured to de-assert activation signal 507 in response to a de-assertion of enable signal 508.

Comparator circuit 505 is configured, in response to an assertion of activation signal 507, to generate control signal using reference voltage 108 and feedback signal 506. By delaying the activation of comparator circuit 505, the control loop of power supply circuit 100 may be open until a particular time period (as determined by activation circuit 504) has elapsed, thereby preventing regulation until reference voltage 108 is at a desired voltage level. In various embodiments, comparator circuit 505 may be a differential amplifier or other similar amplifier circuit configured to generate a voltage level on control signal 107 that is proportional to a difference between reference voltage 108 and a voltage level of feedback signal 506.

Figure 6:
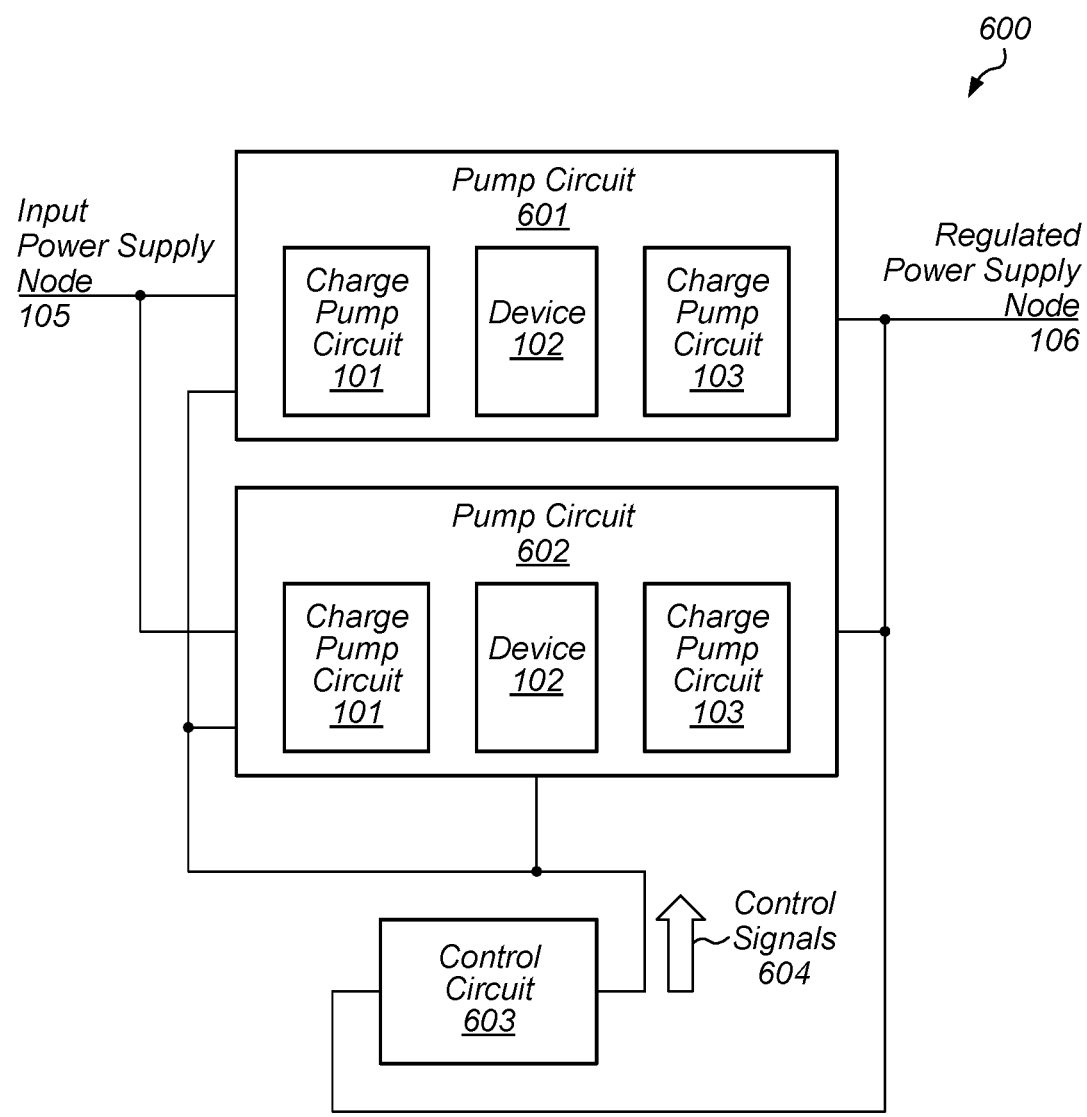
FIG. 6 is a block diagram of an embodiment of a power supply circuit with parallel charge pump circuits.

In some cases, the current demand for load circuits that are coupled to regulated power supply node 106 may exceed a maximum current that can be supplied by power supply circuit 100. In such cases, multiple charge pump circuits may be used in parallel. An embodiment of a power supply circuit that employs parallel charge pump circuits is depicted in FIG. 6. As illustrated, power supply circuit 600 includes pump circuits 601 and 602, and control circuit 603.

Pump circuit 601 includes instances of charge pump circuit 101, device 102, and charge pump circuit 103. In a similar fashion, pump circuit 602 also includes instances of charge pump circuit 101, device 102, and charge pump circuit 103. Both pump circuits 601 and 602 are coupled, in parallel, between input power supply node 105 and regulated power supply node 106.

In a similar fashion to control circuit 104, control circuit 603 is configured to generate control signals 604 using a voltage level of regulated power supply node 106. Each of pump circuits 601 and 602 is configured to generate, using control signals 704, a particular voltage level on regulated power supply node 106. Since pump circuits 601 and 602 are coupled in parallel, they are each sourcing current to regulated power supply node 106, increasing an amount of current that can be provided to a load circuit for a given voltage level of regulated power supply node 106. By providing additional output current, power supply circuit 600 can be used in conjunction with load circuits that have higher power supply current demands.

Figure 7:
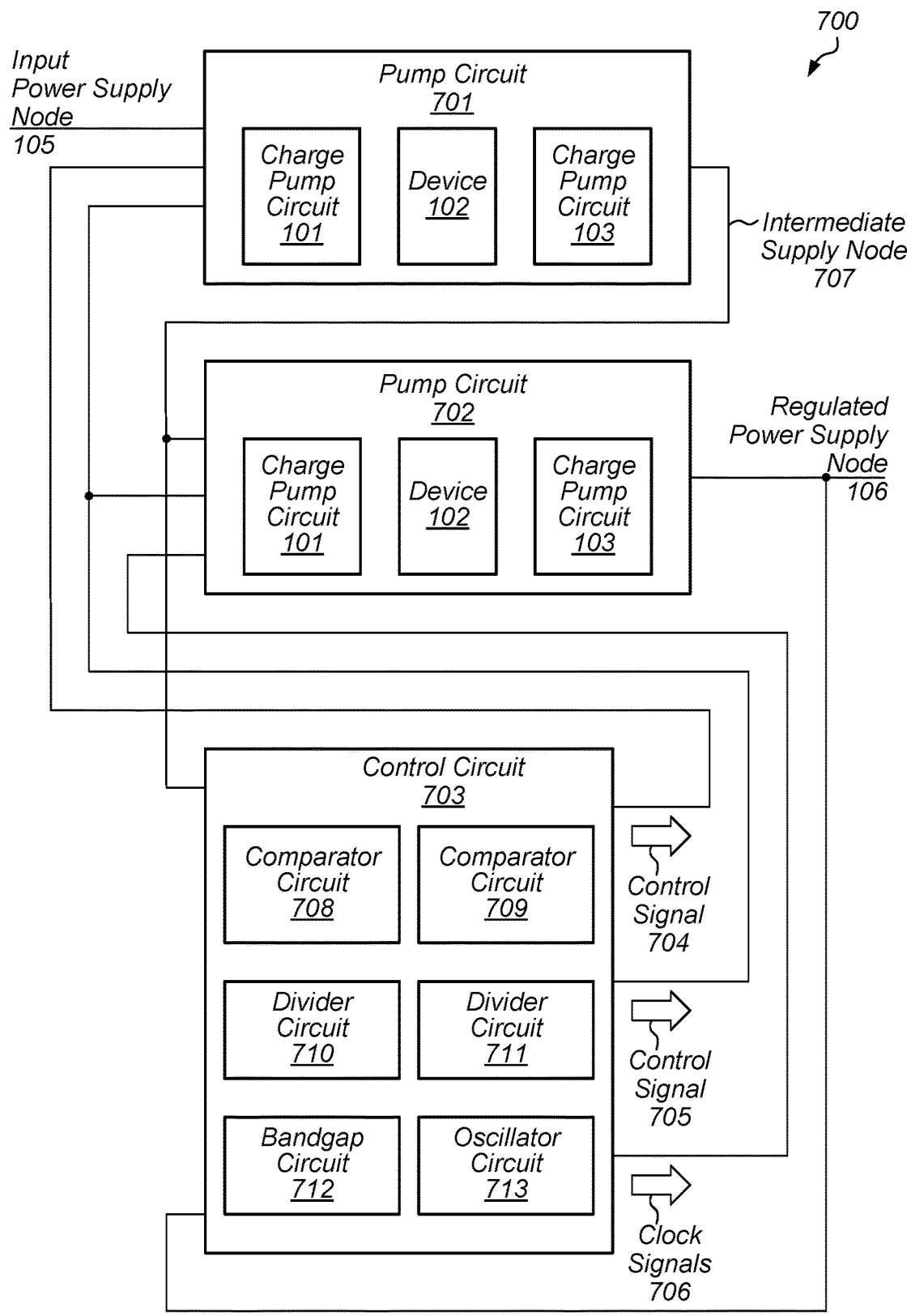
FIG. 7 is a block diagram of an embodiment of a power supply circuit with serial charge pump circuits.

Just as some load circuits may employ higher power supply currents, other load circuits may employ power supply voltage level higher than what power supply circuit 100 can supply. In such cases, multiple charge pumps may be coupled in series to further increase a voltage level of regulated power supply node 106. An embodiment of a power supply circuit that employs series charge pump circuits is depicted in FIG. 7. As illustrated, power supply circuit 700 includes pump circuits 701 and 702, and control circuit 703.

Pump circuit 701 includes instances of charge pump circuit 101, device 102, and charge pump circuit 103. In a similar fashion, pump circuit 702 also includes instances of charge pump circuit 101, device 102, and charge pump circuit 103. Pump circuits 701 is configured to generate, using control signal 704 and input power supply node 105, a voltage level on intermediate supply node 707, and pump circuit 702 is configured to generate, using control signal 705 and intermediate supply node 707, a voltage level on regulated power supply node 106.

Control circuit 703 includes comparator circuits 708 and 709, divider circuits 710 and 711, bandgap circuit 712 and oscillator circuit 713. In a similar fashion to control circuit 104, control circuit 703 is configured to generate control signals 704 and 705, as well as clock signals 706. Since each of pump circuits 701 and 702 need to regulate separately, control circuit 104 uses both the voltage of intermediate supply node 707 and the voltage of regulated power supply node 106 to generate controls signals 704 and 705.

Bandgap circuit 712 is configured to generate a reference voltage, while oscillator circuit 713 is configured to generate clock signals 706. Divider circuit 710 is configured to generate, using the voltage level of intermediate supply node 707, a first feedback signal, and divider circuit 711 is configured to generate, using the voltage level of regulated power supply node 106, a second feedback signal. Comparator circuit 708 is configured to generate, using the reference voltage and the first feedback signal, control signal 107. Comparator circuit 709 is configured to generate, using the reference voltage and the second feedback signal, control signal 705. It is noted that control circuit 703 may include any other suitable components (e.g., activation circuit 504) from control circuit 104.

As described above, the combination of charge pump circuit 101, device 102, and charge pump circuit 103 is configured to generate an output voltage level greater than a voltage level of an input power supply. As such, pump circuit 701 is configured to generate a voltage level of intermediate supply node 707 that is greater than the voltage level of input power supply node 105. Pump circuit 702 is configured to generate a voltage on regulated power supply node 106 that is greater than the voltage level of intermediate supply node 707. Since pump circuit 701 and pump circuit 702 are coupled in series, the resultant voltage on regulated power supply node 106 is greater than what a single one of pump circuits 701 and 702 can provide individually. By providing a higher output voltage level, power supply circuit 700 can be used in conjunction with load circuits which employ higher power supply voltage levels. It is noted that the techniques described in conjunction with FIGS. 6 and 7 may be used in combination, in order to generate an increased voltage level on regulated power supply node 106, in addition to being able to source additional current to load circuits.

Figure 8:
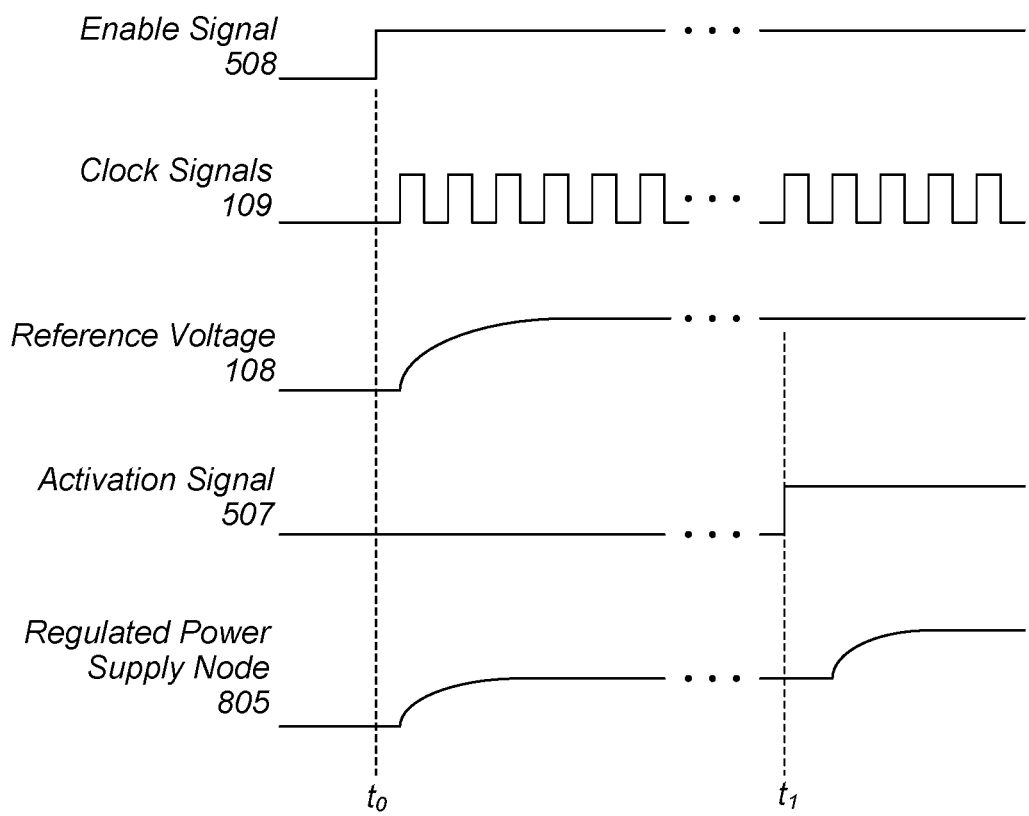
FIG. 8 is a diagram depicting example waveforms associated with the operation of a power supply circuit.

Turning to FIG. 8, example waveforms associated with the operation of power supply circuit 100 are depicted. As illustrated, enable signal 508 is asserted at time $t_0$. In response to the assertion of enable signal 508, clock signals 109 begin to transition. It is noted that although only a single clock signal is depicted in FIG. 8, in various embodiments, clock signals 109 may include multiple signals that begin transitioning in the assertion of enable signal 508.

As described above, the assertion of enable signal 508 results in reference circuit 502 activating and beginning to generate reference voltage 108. Initially, reference voltage 108 is at or near ground potential, and once enable signal 508 is asserted, reference voltage 108 begins to increase in value.

Once transitions begin on clock signal 109, charge pumps circuits 101 and 103 begin to operate, allowing the voltage of regulated power supply node 106 to increase. It is noted that during this time, power supply circuit 100 is running "open loop" as comparator circuit 505 has yet to be activated, so there is no control of device 102.

At time ti, activation signal 507 is asserted. In various embodiments, time ti may be determined based on a number of cycles of a given one of clock signals 109. Alternatively, time ti may be determined when reference voltage 108 reaches a threshold value that is suitable for power supply circuit 100 to begin regulation. In response to the assertion of activation signal 507, comparator circuit 505 is activated, and control signal 107 is generated, thereby allowing power supply circuit 100 to regulate the voltage level of regulated power supply node 106 to a desired level.

It is noted that the waveforms depicted in FIG. 8 are merely examples, and that in other embodiments, the waveforms may appear different due to variation in circuit implementation, differences in voltage levels, and the like.

Figure 9:
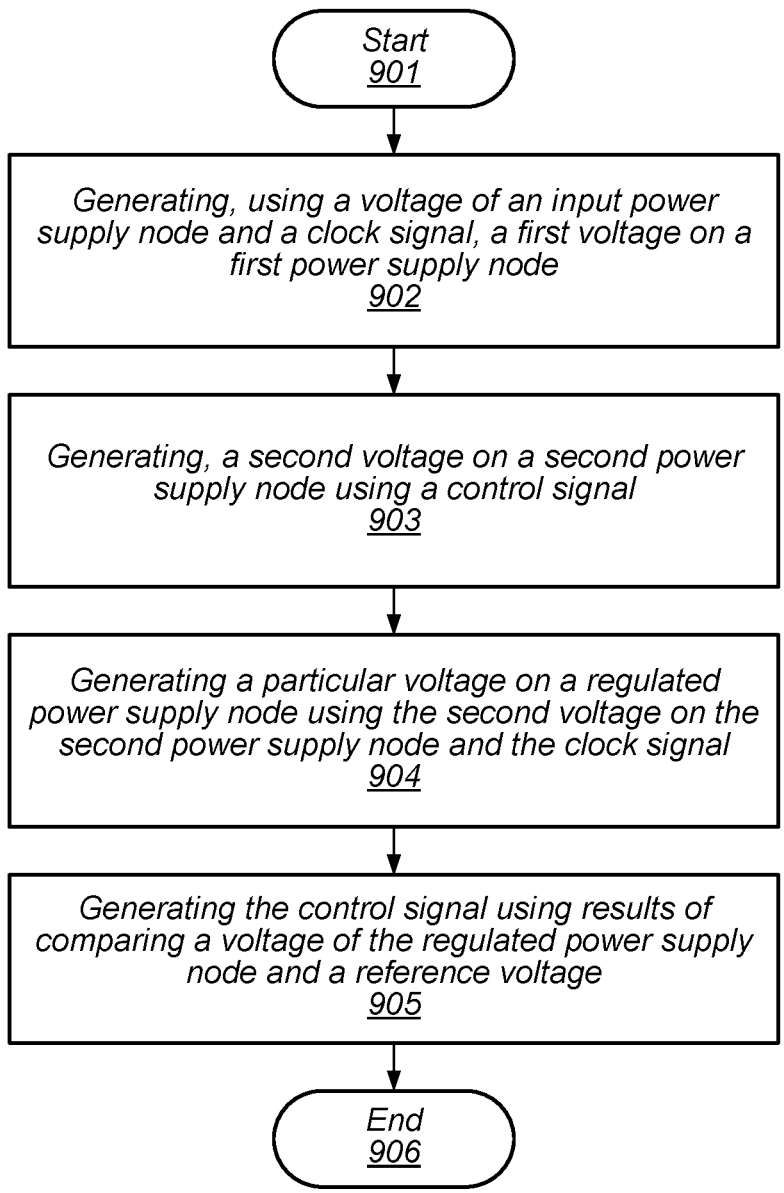
FIG. 9 depicts a flow diagram illustrating an embodiment of a method for operating a power supply circuit.

Turning to FIG. 9, a flow diagram depicting an embodiment of a method for operating a power supply circuit is illustrated. The method, which begins in block 901, may be applied to various power supply circuits, such as power supply circuit 100 as illustrated in FIG. 1.

The method includes generating, using a voltage of an input power supply node and a clock signal, a first voltage on a first power supply node (block 902). In various embodiments, the first voltage of the first power supply node is greater than the voltage of the input power supply node. The input power supply may, in some embodiments, be a digital power supply node.

The method further includes generating a second voltage on a second power supply node using a control signal and the first voltage (block 903). In some embodiments, the second voltage of the second power supply node is less than the first voltage of the first power supply node.

The method also includes generating a particular voltage on a regulated power supply node using the second voltage and the clock signal (block 904). The regulated power supply node may, in some embodiments, be an analog power supply node.

The method further includes generating the control signal using results of comparing a voltage of the regulated power supply node and a reference voltage (block 905). The method may, in some embodiments, also include generating, by a voltage divider circuit, a feedback signal using the voltage of the regulated power supply node. In various embodiments, generating the control signal may include comparing the reference voltage and a voltage level of the feedback signal. In some embodiments, the method may also include generating the reference voltage using a bandgap reference circuit. The method concludes in block 906.

Figure 10:
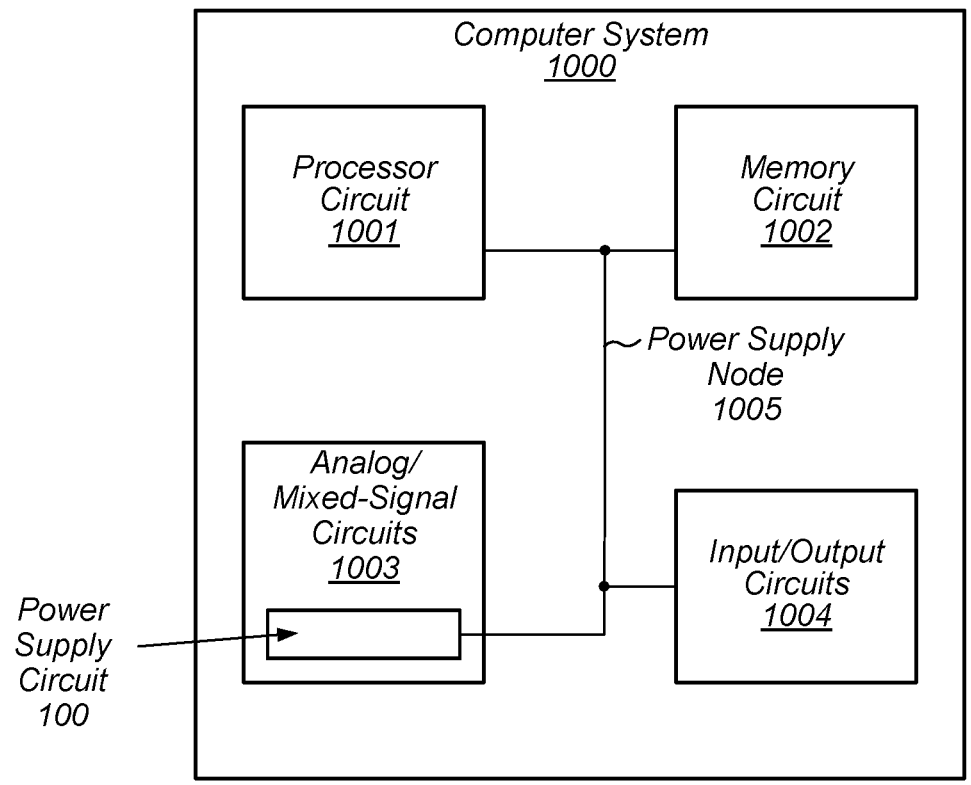
FIG. 10 illustrates a block diagram of a computer system.

A block diagram of computer system is illustrated in FIG. 10. In the illustrated embodiment, the computer system 1000 includes processor circuit 1001, memory circuit 1002, analog/mixed-signal circuits 1003, and input/output circuits 1004, each of which is coupled to power supply node 1005. In some cases, power supply node 1005 may be a digital power supply node with a noise level not suitable for some analog circuits. In various embodiments, computer system 1000 may be a system-on-a-chip (SoC) and/or be configured for use in a desktop computer, server, or in a mobile computing application such as, e.g., a tablet, laptop computer, or wearable computing device.

Processor circuit 1001 may, in various embodiments, be representative of a general-purpose processor that performs computational operations. For example, processor circuit 1001 may be a central processing unit (CPU) such as a microprocessor, a microcontroller, an application-specific integrated circuit (ASIC), or a field-programmable gate array (FPGA).

Memory circuit 1002 may in various embodiments, include any suitable type of memory such as a Dynamic Random-Access Memory (DRAM), a Static Random-Access Memory (SRAM), a Read-Only Memory (ROM), Electrically Erasable Programmable Read-only Memory (EEPROM), or a non-volatile memory, for example. It is noted that although in a single memory circuit is illustrated in FIG. 10, in other embodiments, any suitable number of memory circuits may be employed.

Analog/mixed-signal circuits 1003 may include a crystal oscillator circuit, a phase-locked loop circuit, an analog-to-digital converter (ADC) circuit, and a digital-to-analog converter (DAC) circuit (all not shown). In various embodiments, analog/mixed-signal circuits 1003 may include one or more instances of power supply circuit 100 configured to generate, using a voltage level of power supply node 1005, a voltage level on a power supply node that is suitable for used with some analog circuits (e.g., analog-to-digital converter circuit, digital-to-analog converter circuit, etc.).

Input/output circuits 1004 may be configured to coordinate data transfer between computer system 1000 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, input/output circuits 1004 may be configured to implement a version of Universal Serial Bus (USB) protocol or IEEE 1394 (Firewire®) protocol.

Input/output circuits 1004 may also be configured to coordinate data transfer between computer system 1000 and one or more devices (e.g., other computing systems or integrated circuits) coupled to computer system 1000 via a network. In one embodiment, input/output circuits 1004 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, input/output circuits 1004 may be configured to implement multiple discrete network interface ports.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
   a first charge pump circuit configured to generate a given voltage on a first power supply node using a clock signal and an input power supply node, wherein the given voltage is greater than a voltage of the input power supply node;
   a device coupled between the first power supply node and a second power supply node, wherein the device is configured to adjust, using a control signal, a conductance between the first and second power supply nodes;
   a second charge pump circuit configured to generate, using the second power supply node and the clock signal, a particular voltage on a regulated power supply node; and
   a control circuit configured to generate the control signal using a voltage of the regulated power supply node and a reference voltage.

2. The apparatus of claim 1, wherein the control circuit includes a voltage divider circuit configured to generate a feedback signal using the voltage of the regulated power supply node.

3. The apparatus of claim 2, wherein the device includes one or more transistors coupled between the first power supply node and the second power supply node, and wherein the control circuit further includes a comparator circuit configured to compare the reference voltage and a voltage level of the feedback signal to generate the control signal.

4. The apparatus of claim 3, wherein the control circuit further includes a bandgap reference circuit configured to generate the reference voltage.

5. The apparatus of claim 4, wherein the control circuit further includes an oscillator circuit configured to generate the clock signal using the input power supply node.

6. The apparatus of claim 5, wherein the control circuit is further configured, in response to receiving an enable signal, to:
   activate the bandgap reference circuit; and
   enable the comparator circuit after a time period has elapsed since the bandgap reference circuit was activated.

7. A method, comprising:
   generating, using a voltage of an input power supply node and a clock signal, a first voltage on a first power supply node;
   adjusting a conductance between the first power supply node and a second power supply node using a control signal;
   generating a particular voltage on a regulated power supply node using a second voltage on the second power supply node and the clock signal; and
   generating the control signal using results of comparing a voltage of the regulated power supply node and a reference voltage.

8. The method of claim 7, wherein the first voltage of the first power supply node is greater than the voltage of the input power supply node, and wherein the second voltage of the second power supply node is less than the first voltage of the first power supply node.

9. The method of claim 7, further comprising, generating, by a voltage divider circuit, a feedback signal using the voltage of the regulated power supply node.

10. The method of claim 9, wherein generating the control signal includes comparing the reference voltage and a voltage level of the feedback signal.

11. The method of claim 7, further comprising, generating the reference voltage using a bandgap reference circuit.

12. The method of claim 11, further comprising, enabling the bandgap reference circuit, in response to receiving an enable signal.

13. The method of claim 12, further comprising, enabling the generating of the control signal after a given period of time has elapsed since the bandgap reference circuit was enabled.

14. An apparatus, comprising:
   a first pump circuit including a first pair of charge pump circuits and a first device, wherein the first pump circuit is coupled to an input power supply node, wherein the first device is configured to adjust a first conductance between the first pair of charge pump circuits using a first control signal, and wherein the first pump circuit is configured to generate, using the first control signal and a plurality of clock signals, a first voltage level on an intermediate supply node, wherein the first voltage level is greater than a voltage level of the input power supply node; and
   a second pump circuit including a second pair of charge pump circuits and a second devices, wherein the second pump circuit is coupled to the intermediate supply node, wherein the second device is configured to adjust a second conductance between the second pair of charge pump circuits using a second control signal, and wherein the second pump circuit is configured to generate, using the second control signal and the plurality of clock signals, a second voltage level on a regulated power supply node, and wherein the second voltage level is greater than the first voltage level; and
   a control circuit configured to:
      generate the plurality of clock signals;
      generate the first control signal using a voltage level of the intermediate supply node; and generate the second control signal using a voltage level of the regulated power supply node.

15. The apparatus of claim 14, wherein the control circuit includes:
   a first voltage divider circuit configured to generate a first feedback signal using the voltage level of the intermediate supply node; and
   a second voltage divider circuit configured to generate a second feedback signal using the voltage level of the regulated power supply node.

16. The apparatus of claim 15, wherein the control circuit further includes:
   a first comparator circuit configured to compare a reference voltage and a voltage level of the first feedback signal to generate the first control signal; and
   a second comparator circuit configured to compare the reference voltage to a voltage level of the second feedback signal to generate the second control signal.

17. The apparatus of claim 16, wherein the control circuit further includes a bandgap reference circuit configured to generate the reference voltage.

18. The apparatus of claim 17, wherein the control circuit is further configured, in response to receiving an enable signal, to:
   activate the bandgap reference circuit; and
   enable the first comparator circuit and the second comparator circuit after a time period has elapsed since the bandgap reference circuit was activated.

19. The apparatus of claim 14, wherein the control circuit further includes an oscillator circuit configured to generate the plurality of clock signals.

20. The apparatus of claim 14, further comprising:
   a third pump circuit coupled to the input power supply node, wherein the third pump circuit is configured to generate, using the first control signal and the plurality of clock signals, the first voltage level on a first supply node; and
   a fourth pump circuit coupled to the first supply node, wherein the second pump circuit is configured to generate, using the second control signal and the plurality of clock signals, the second voltage level on the regulated power supply node.

* * * * *